Dec. 14, 1937.  H. L. JOHNSTON  2,102,180
FOOD HANDLING APPARATUS
Filed Feb. 23, 1934  2 Sheets-Sheet 1
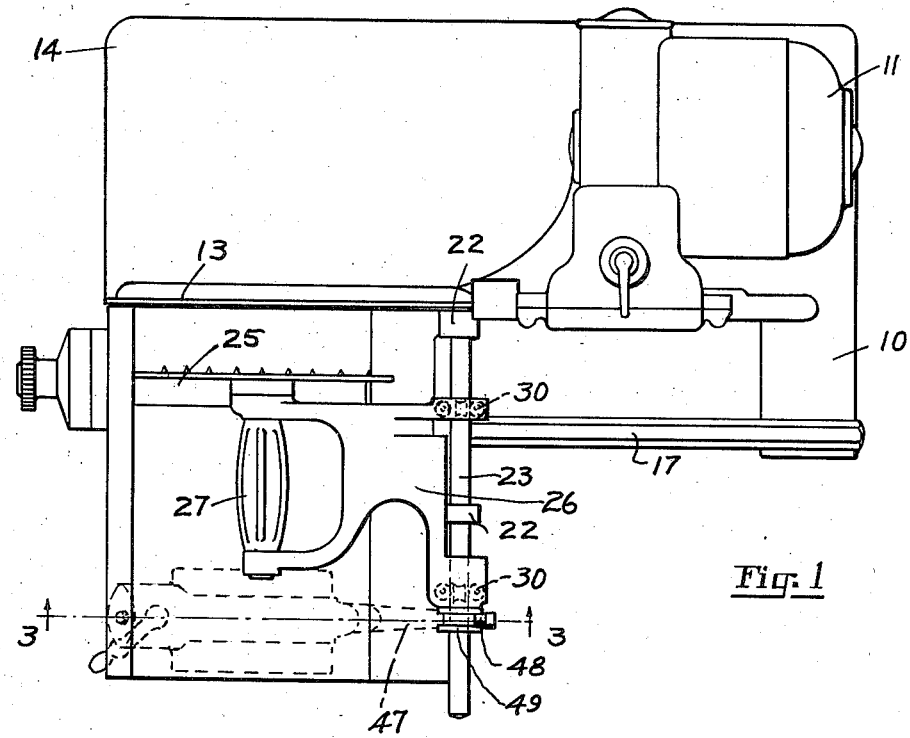
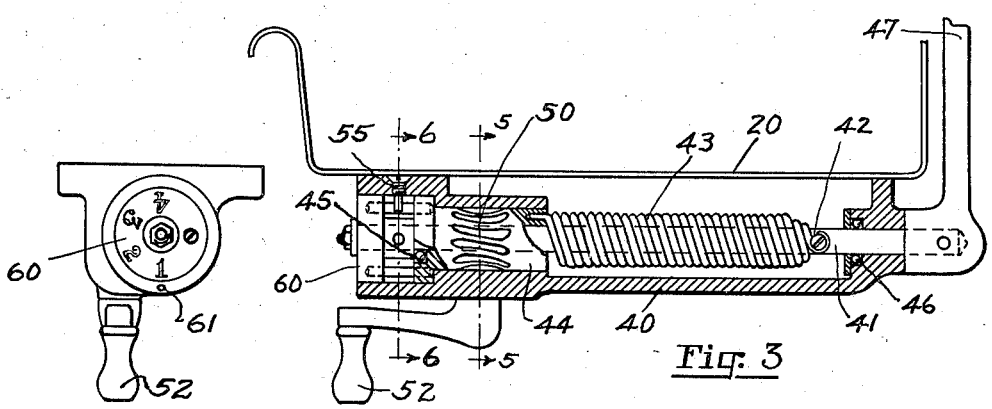
INVENTOR
Herbert L. Johnston
BY Maréchal + Noe
ATTORNEY Dec. 14, 1937. H. L. JOHNSTON 2,102,180
FOOD HANDLING APPARATUS
Filed Feb. 23, 1934 2 Sheets-Sheet 2

INVENTOR
Herbert L. Johnston
BY Maréchal & Roe
ATTORNEY

Patented Dec. 14, 1937

2,102,180

UNITED STATES PATENT OFFICE 2,102,180

FOOD HANDLING APPARATUS

Herbert L. Johnston, Troy, Ohio, assignor to The Hobart Manufacturing Company, Troy, Ohio, a corporation of Ohio Application February 23, 1934, Serial No. 712,580

13 Claims. (Cl. 146—102)

This invention relates to food handling apparatus and more particularly to slicing machines.

It is the principal object of the present invention to provide a slicing machine having simple and effective means tending to urge the work material toward the cutting knife.

It is a further object to provide a slicing machine in which the force with which the work is urged toward the cutting knife may be varied and predetermined as desired.

It is a further object to provide a slicing machine having means tending to urge the work material toward the knife, which means is protected and enclosed so as to maintain a highly sanitary construction.

Other objects and advantages will be apparent from the description, the accompanying drawings and the appended claims.

In the drawings,—

Fig. 1 is a plan view of a slicing machine constructed in accordance with the present invention;

Fig. 3 is a vertical sectional view taken on the line 3—3 of Fig. 1;

Fig. 4 is an elevational view of the spring adjustment and indexing unit;

Figure 2:
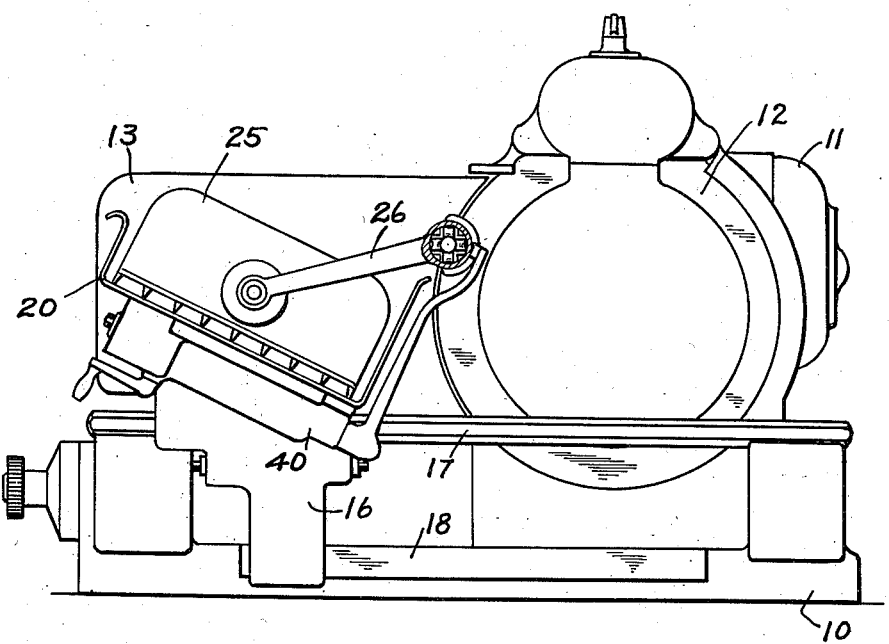
Fig. 2 is a front elevational view of the machine.
Figure 8:
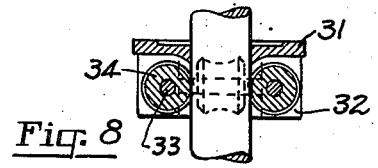
Figs. 7 and 8 are detail views at right angles to each other of a roller bearing used for supporting the pusher plate.
Figure 5:
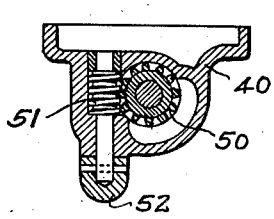
Fig. 5 is a sectional view on the line 5—5 of Fig. 3.
Figure 6:
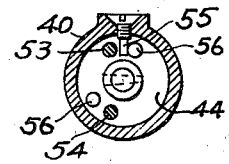
Fig. 6 is a sectional view on the line 6—6 of Fig. 3.
Figure 7:
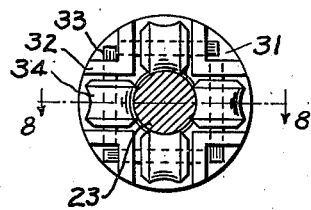

Referring to the drawings which disclose a preferred embodiment of the invention, there is shown a base 10 supporting a driving motor 11 which is mechanically connected for driving the rotary knife 12. The gage plate 13 is mounted in cooperative relation with the knife and a slice tray 14 receives the slices as they are cut off.

A work supporting carriage 16 is mounted upon a supporting bar 17 and a guide bar 18 and arranged for horizontal reciprocating movement across the face of the rotary knife. The carriage comprises a trough portion 20, and is provided at one end with a pair of spaced lugs 22 which serve to support a cross shaft 23. The pusher plate indicated generally at 25 is rotatably mounted upon an arm 26 which in turn is journaled upon the cross shaft 23 in such manner that it is capable of both swinging movement into and out of the work supporting carriage, and of longitudinal movement toward and away from the rotary knife. The handle 27 provides a convenient operating grip for desired movement of the pusher plate as well as for reciprocating the entire carriage.

To provide for a free swinging and longitudinal movement of the pusher plate upon cross shaft 23, especially constructed bearing members 30 are provided which preferably are spaced from each other as indicated. Each member comprises a disk-like plate 31 upon which are mounted a series of bracket members 32. These brackets serve as supports for spindles 33 upon which rollers 34 are mounted. The face of each roller is grooved to correspond substantially to the periphery of the shaft 23 so that the bearings provide the desired guiding and supporting means for movably mounting the pusher plate upon the shaft 23. With the construction described, binding of the pusher plate with respect to the shaft as a result of an unbalanced thrust is substantially prevented and the pusher plate is free to swing into and out of the carriage or to advance toward the rotary knife without objectionable friction upon its support.

Beneath the work supporting carriage 20 there is positioned a self-contained mechanism which is effective to urge the pusher plate longitudinally toward the rotary knife. This mechanism is entirely enclosed within and protected against access of any food particles or other foreign matter by a housing 40 which may be bolted or attached to the underside of the carriage in any convenient manner. The mechanism comprises a shaft 41 mounted substantially parallel with the face of the knife to which is attached as at 42 one end of a resilient torsional spring member 43, the other end of which is fastened into a sleeve member 44. The sleeve is mounted for rotational movement in housing 40 so that upon rotation thereof, more or less tension is imparted to spring 43 and by it to shaft 41. Bearings 45 and 46 in sleeve 44 and in housing 40 rotatably support shaft 41. The shaft extends beyond the housing and has connection with an operating arm 47 which extends upwardly toward the pusher plate arm 26 and is provided at its end with a roller 48. The pusher plate arm 26 is provided with integral spaced arcuate surfaces 49 which are adapted to engage opposite sides of the roller 48 in an antifriction manner. The surfaces 49 are of sufficient angular extent so that the roller 48 will have engagement therewith throughout the range of swinging movement of the pusher plate. Tension applied to shaft 41 by the spring is therefore transmitted by arm 47 to the pusher plate which is thereby urged toward the rotary knife.

Means are provided for varying the tension in the spring 43 to thereby vary the degree of force with which the pusher plate is urged toward the rotary knife. For this purpose sleeve 44 is formed with an external gear surface 50 which has intermeshing engagement with a worm 51 to which is attached the operating handle 52. Upon rotation of handle 52, corresponding rotation of the sleeve 44 is produced which is effective to vary the tension in spring 43. The construction is preferably such that the intermeshing gear surfaces 50 and 51 have sufficient frictional engagement to resist movement from an adjusted position so that the spring will remain in any predetermined set position.

The sleeve 44 is further provided with limit pins 53 and 54. These pins cooperate with a pin 55 fixed in housing 40 to limit the extent of rotation of the sleeve to a predetermined range. If desired, additional holes 56 may be provided in the sleeve for the positioning of the pins 53 and 54 when a different range of adjustment is desired. This also provides for a preliminary adjustment to compensate for manufacturing variation in the spring and related parts.

The sleeve also carries upon its outer exposed face, an indexing member 60 carrying several position indications such as illustrated. These in cooperation with a fixed point 61, serve to indicate to the operator at any time the exact position of adjustment of the spring. Furthermore the indexing member seals the end of the housing so that it is maintained impervious against access of foreign matter.

The operation of the device will be obvious from the above. The carriage is adapted to be reciprocated past the rotary knife by manual operation. The work material which is positioned in the carriage is engaged by the pusher plate which through the action of resilient member 43, shaft 41, operating arm 47, and roller 48 bearing against the surface 49 of the pusher plate assembly, tends to urge the work toward the rotary knife, advancing it after each slice is cut off. The degree of force applied to the pusher plate may be varied over a considerable range, and at all times is readily adjustable in accordance with the wishes of the operator and with the characteristics of the work material. The pusher plate is urged toward the rotary knife throughout its range of movement and no objectionable binding of the pusher plate on its supporting means occurs in any position thereof.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A slicing machine of the character described comprising a rotary knife, a carriage for holding the material to be sliced, means for mounting the carriage for reciprocating movement with respect to said knife, a pusher plate, means for mounting said pusher plate for swinging movement into and out of said carriage and for movement toward and away from said knife from a position at the remote end of said carriage into a position in close juxtaposition to the plane of said knife, torsional spring means mounted in a protected and substantially enclosed position beneath the plane of said carriage and means pivotally mounted on said carriage interconnecting said spring means and said pusher plate mounting means and operable throughout the range of movement of said pusher plate for urging said pusher plate toward said knife.

2. A slicing machine of the character described comprising a rotary knife, a work supporting carriage, means for mounting said carriage providing for reciprocating movement thereof with respect to said knife, a pusher plate, a pusher plate arm for supporting said pusher plate, means for mounting said pusher plate arm to provide for swinging movement of said pusher plate into and out of said carriage and for longitudinal movement toward and away from said knife, and means for urging said pusher plate toward said knife including a shaft positioned beneath said carriage and extending substantially parallel to the plane of the knife, means tending to cause rotation of said shaft, an operating arm connected to said shaft for operation thereby, said arm extending adjacent said pusher plate arm, and means on said pusher plate arm continuously engaging said operating arm throughout the range of movement of said pusher plate for causing the urging of said pusher plate toward the knife and into substantial juxtaposition therewith.

3. A slicing machine of the character described comprising a rotary knife, a work supporting carriage, means for mounting said carriage providing for reciprocating movement thereof with respect to said knife, a pusher plate, a pusher plate arm for supporting said pusher plate, means for mounting said pusher plate arm to provide for swinging movement of said pusher plate into and out of said carriage and for longitudinal movement toward and away from said knife, and means for urging said pusher plate toward said knife including a shaft positioned beneath said carriage, means tending to cause rotation of said shaft, an operating arm fastened to said shaft and extending toward said pusher plate arm, said pusher plate arm being provided with an extended bearing surface against which said operating arm is adapted to engage to provide for urging said pusher plate toward said knife throughout its range of swinging movement.

4. A slicing machine of the character described comprising a rotary knife, a work supporting carriage, means for mounting the carriage for reciprocating movement with respect to the knife, a pusher plate, means for mounting said pusher plate in said carriage providing for swinging and longitudinal movement thereof, means for advancing said pusher plate toward the knife throughout its extent of longitudinal movement with a substantially uniform force including a rotatable member located beneath said carriage, means tending to rotate said member, and a connecting arm swingably mounted for movement with said member and having engagement with said pusher plate throughout its extent of movement.

5. A slicing machine of the character described comprising a rotary knife, a work supporting carriage, means for mounting said carriage for reciprocating movement with respect to said knife, a pusher plate, means for mounting the pusher plate on said carriage providing for swinging movement into and out of the carriage and for movement toward and away from said knife, means for advancing said pusher plate toward the knife throughout its extent of longitudinal movement with a substantially uniform force including a rotatable member located beneath said carriage, means tending to rotate said member, and a connecting arm mounted on said member and extending around said carriage into engagement with said pusher plate throughout its extent of movement.

6. A slicing machine of the character described comprising a rotary knife, a work supporting carriage, means for mounting said carriage for reciprocating movement with respect to said knife, a pusher plate, means for mounting said pusher plate for swinging movement into and out of said carriage and for longitudinal movement toward and away from said knife, means for urging said pusher plate toward said knife, said means including a rotatable member positioned below said carriage, means tending to cause rotation of said member, an arm mounted on one end of said member at the forward side of said carriage and having continuous connection with said pusher plate, and means operable from the other end of said member for adjusting the force with which said pusher plate is urged toward the knife.

7. A slicing machine of the character described comprising a rotary knife, a work supporting carriage, means for mounting said carriage for reciprocating movement with respect to said knife, a pusher plate, means for mounting said pusher plate for swinging movement into and out of said carriage and for longitudinal movement toward and away from said knife, means for urging said pusher plate toward said knife including a shaft positioned below said carriage, a resilient member having one end held in predetermined position and having its other end fixed to said shaft providing for placing said shaft under tension, connecting means between said shaft and said pusher plate tending to move said pusher plate toward the plane of said knife, and means for changing the positioning of said one end of the resilient member with respect to the shaft to vary the tension thereof and the degree of force with which said pusher plate is urged toward the knife.

8. A slicing machine of the character described comprising a rotary knife, a work supporting carriage, means for mounting said carriage for reciprocating movement with respect to said knife, a pusher plate, means on the forward side of said carriage for mounting said pusher plate for swinging and for longitudinal movement with respect to said carriage, means tending to urge said pusher plate toward said knife throughout the range of movement of the pusher plate including resiliently operated means positioned in a protected position beneath said carriage, means connecting with said resiliently operated means and extending upwardly at the forward side of said carriage and having operating engagement with said pusher plate to urge said pusher plate toward and into the plane of said knife, adjusting means located on the rearward side of said carriage in position for convenient accessibility by the operator, and connections between said adjusting means and said resiliently operated means for varying the setting of the latter to provide variation in the degree of force with which said pusher plate is urged toward the knife.

9. A slicing machine of the character described, comprising a rotary knife, a work supporting carriage, means for mounting the carriage for reciprocating movement with respect to said knife, a pusher plate, means for mounting said pusher plate for swinging movement and for longitudinal movement with respect to said knife, means for urging said pusher plate toward said rotary knife including a shaft positioned beneath said carriage, a resilient member having one end connected to said shaft, and the other end held in predetermined fixed position such that said resilient member is placed under torsion, and connections between said shaft and said pusher plate including an arm mounted on said shaft and engaging said pusher plate, said arm having a swinging movement in response to rotation of said shaft to urge said pusher plate toward said rotary knife.

10. A slicing machine of the character described, comprising a rotary knife, a work supporting carriage, means for mounting the carriage for reciprocating movement with respect to said knife, a pusher plate, means for mounting said pusher plate for swinging movement and for longitudinal movement with respect to said knife, a shaft carried by and positioned beneath said carriage, a coil spring mounted on said shaft and having one end fastened thereto, a sleeve rotatably positioned on said shaft and receiving the opposite end of the spring, means for adjusting said sleeve to a predetermined position to thereby maintain a predetermined tension of said spring, and connections between said shaft and said pusher plate providing for urging said pusher plate toward said rotary knife.

11. A slicing machine of the character described, comprising a rotary knife, a work supporting carriage, means for mounting the carriage for reciprocating movement with respect to said knife, a pusher plate, means for mounting said pusher plate for swinging movement and for longitudinal movement with respect to said knife, a shaft carried by and positioned beneath said pusher plate, a coil spring surrounding said shaft, and having an end fastened thereto, a sleeve rotatably mounted on said shaft and receiving the opposite end of said spring, said sleeve being provided with gear teeth, an operating member having gear teeth meshing with the teeth on said sleeve for holding said sleeve in a predetermined adjusted position and providing for turning of said sleeve with respect to said shaft to thereby vary the tension on said spring, and means connecting said shaft with said pusher plate to urge said pusher plate toward said rotary knife.

12. A slicing machine of the character described, comprising a rotary knife, a work supporting carriage, means for mounting the carriage for reciprocating movement with respect to said knife, a pusher plate, means for mounting said pusher plate for swinging movement and for longitudinal movement with respect to said knife, a shaft carried by and positioned beneath said carriage, a resilient member having one end attached to said shaft, a sleeve rotatably mounted on said shaft and receiving an opposite end of said resilient member, means for turning said sleeve with respect to said shaft and for holding said sleeve in a predetermined adjusted position to thereby place said resilient member under tension, an indexing member carried by said sleeve and cooperating with a fixed marker for indicating the degree of tension of said resilient member, and connections between said shaft and said pusher plate for urging said pusher plate toward said rotary knife.

13. A slicing machine of the character described comprising a base, a rotary knife, a work supporting carriage, guide means, a support slidably mounted on said guide means, means for mounting said carriage on said support providing for reciprocating movement thereof with respect to said knife, a pusher plate, means for mounting said pusher plate on said carriage for longitudinal movement with respect to said carriage up to a position in close juxtaposition to the plane of said knife and providing for swinging movement of the pusher plate into and out of the carriage over substantially the entire longitudinal movement thereof, torsional resilient means entirely mounted beneath said work supporting carriage, a shaft rotated by said resilient means, bearing means upon the said carriage for rotatably supporting said shaft with an end thereof accessible from above the carriage, and a connecting arm between said shaft and said pusher plate mounting means for continuously urging said pusher plate toward said knife to thereby cause feeding of the work material in said carriage toward said knife.

HERBERT L. JOHNSTON.